United States Patent [19]

Tsugita

[11] Patent Number: 4,760,320
[45] Date of Patent: Jul. 26, 1988

[54] STEPPING-MOTOR DRIVING CIRCUIT

[75] Inventor: Kousaku Tsugita, Tokyo, Japan

[73] Assignee: Kabushiki Kaisha Toshiba, Kawasaki, Japan

[21] Appl. No.: 28,566

[22] Filed: Mar. 20, 1987

[30] Foreign Application Priority Data

Mar. 31, 1986 [JP] Japan ................................. 61-72854

[51] Int. Cl.$^4$ ............................................. H02P 8/00
[52] U.S. Cl. .................................... 318/696; 318/685
[58] Field of Search ................................ 318/696, 685

[56] References Cited

U.S. PATENT DOCUMENTS 4,358,725 11/1982 Brendemuehl ...................... 318/696

Primary Examiner—William M. Shoop, Jr.
Assistant Examiner—Saul M. Bergmann
Attorney, Agent, or Firm—Finnegan, Henderson Farabow, Garrett and Dunner

[57] ABSTRACT

A stepping motor driving circuit of this invention is disclosed which includes a stepping motor having excitation coils M1 through M4. Respective excitation coils M1 through M4 are sequentially excited respectively by transistors T1 through T4 on the basis of a predetermined excitation timing. An excitation current is supplied through transistor T5 to excitation coils M1 and M2, while an excitation current is flowed through transistor T6 to excitation coils M3 and M4. The ON/OFF operation of transistors T5 and T6 is performed by a first pulse signal and second pulse signal, noting that the first pulse signal is generated in synchronization with an excitation timing and has a pulse width corresponding to a time required for the excitation current to reach a predetermined level and the second pulse signal is of a high frequency wave type having a smaller pulse width than that of a first pulse signal and is generated during a time period in which the generation of the first pulse signal is stopped.

10 Claims, 5 Drawing Sheets

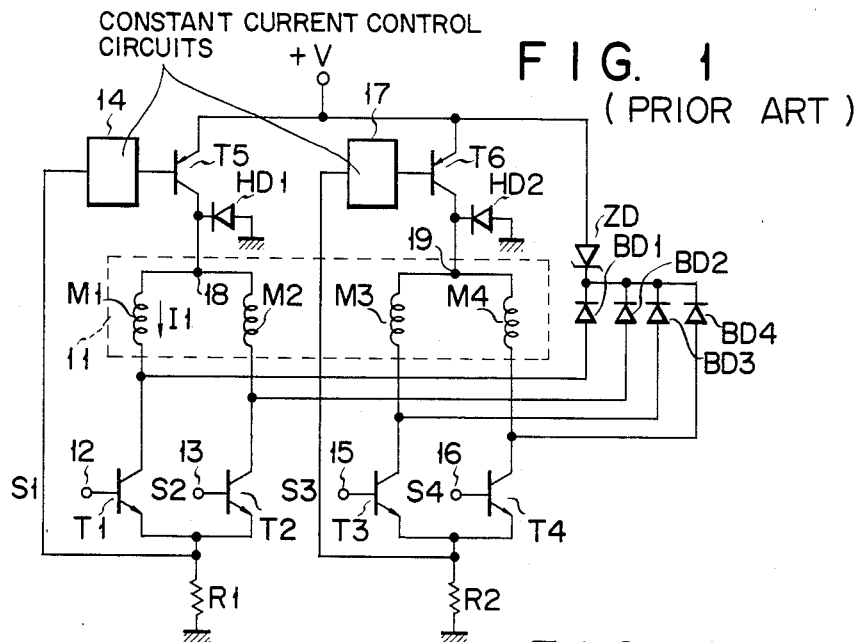
FIG. 1 (PRIOR ART)
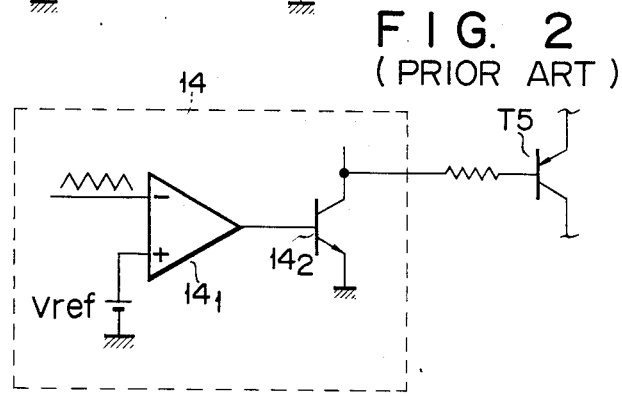
FIG. 2 (PRIOR ART)
FIG. 3A (PRIOR ART) S1
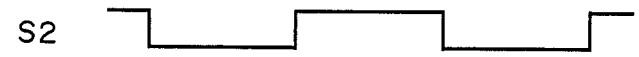
FIG. 3B (PRIOR ART) S2
FIG. 3C (PRIOR ART) S3
FIG. 3D (PRIOR ART) S4
FIG. 3E (PRIOR ART) I1

FIG. 4
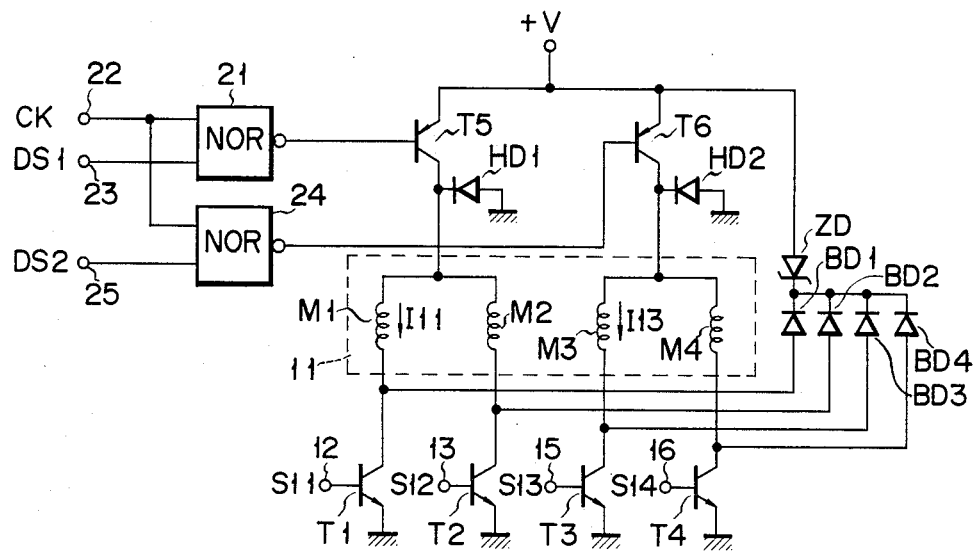
FIG. 5A CT
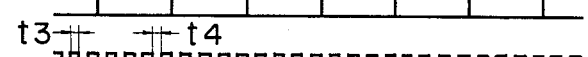
FIG. 5B CK
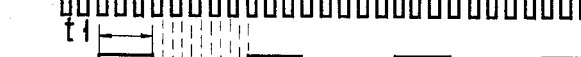
FIG. 5C DS1
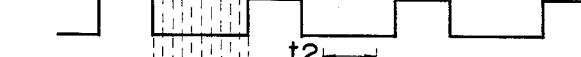
FIG. 5D DS2
FIG. 5E S11
FIG. 5F S12
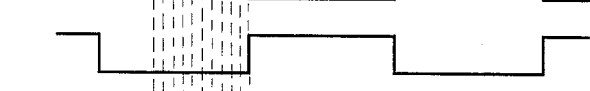
FIG. 5G S13
FIG. 5H S14
FIG. 5I I11

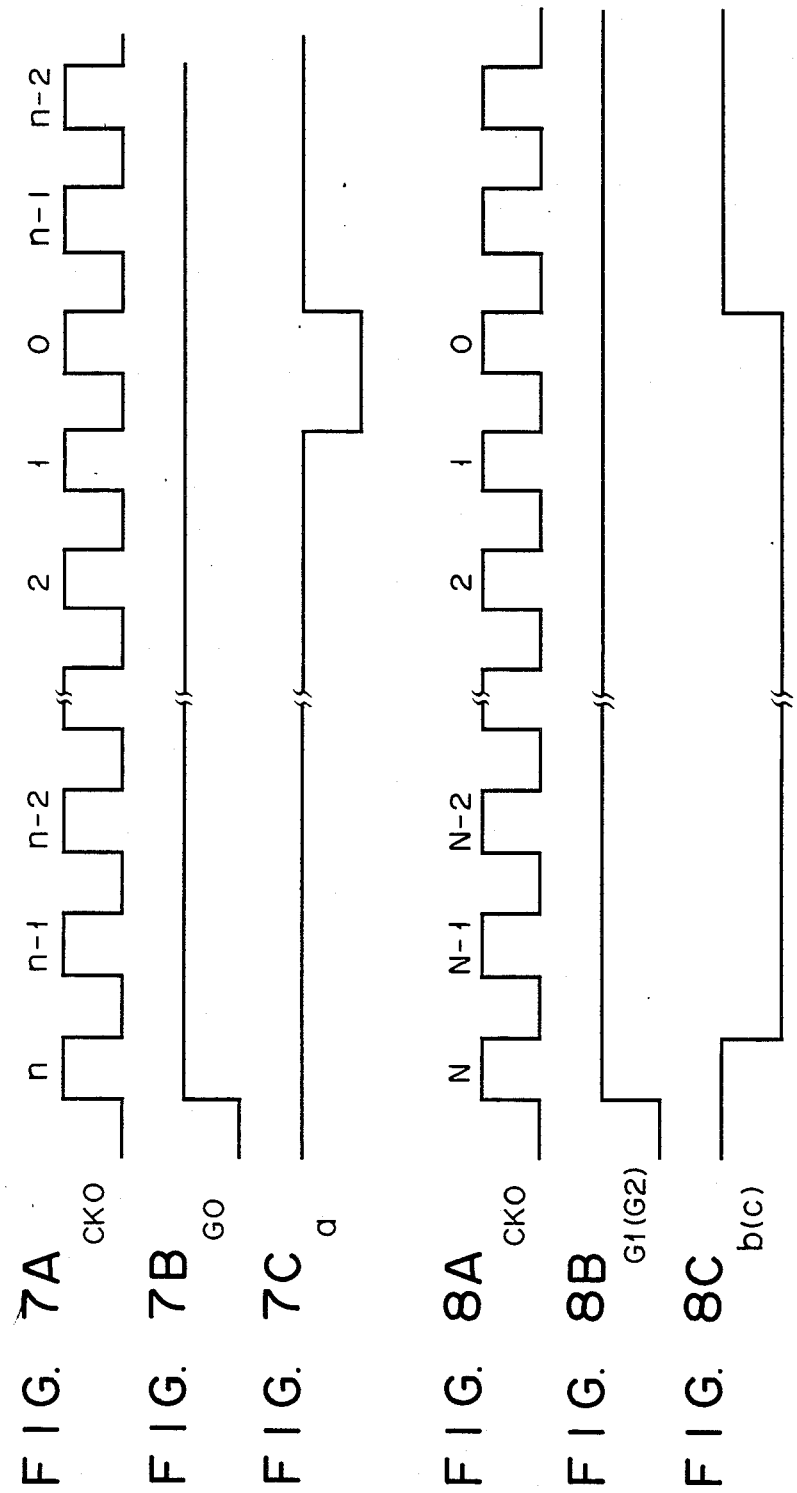

FIG. 9A  CT 
FIG. 9B  S11 
FIG. 9C  S12 
FIG. 9D  S13 
FIG. 9E  S14 
FIG. 9F  d 
FIG. 9G  DS1 
FIG. 9H  e 
FIG. 9I  DS2 
FIG. 10A  S11(S13) 
FIG. 10B  d 
FIG. 10C  S12(S14) 
FIG. 10D  e 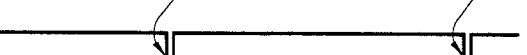

STEPPING-MOTOR DRIVING CIRCUIT

BACKGROUND OF THE INVENTION

This invention relates to a stepping motor driving circuit used for, for example, a serial printer device.

For a conventional stepping motor driving circuit, use has been made of a closed-loop type constant current chopper driving circuit which, in order to improve the torque characteristic when the stepping motor is driven at high speeds, detects electric current through the coil of the stepping motor and controls electric current through the coil on the basis of the result of detection.

FIG. 1 shows a conventional closed-loop type constant current chopper driving circuit, FIG. 2 is a block circuit showing a constant current chopper driving circuit in detail, and FIGS. 3A through 3E are timing charts of the constant current chopper driving circuit.

In FIG. 1, four-phase stepping motor 11 includes four coils M1 through M4. The excitation current through coils M1 and M2 is controlled by transistors T1 and T2. Input terminals 12 and 13 are connected to the bases of transistors T1 and T2, respectively. When high-level signals are input to input terminals 12 and 13, transistors T1 and T2 are turned ON, causing coils M1 and M2 to be magnetically excited.

The level of electric current through coils M1 and M2 is detected as a voltage drop across current detection resistor R1 and the detected current level is input to constant current control circuit 14. Constant current control circuit 14 includes comparator $14_1$, as shown in FIG. 2. The input voltage level and reference voltage level are compared with each other at comparator $14_1$ in constant current control circuit 14. For the input voltage level lower than the reference voltage level, the output of comparator $14_1$ is made at a low level and thus transistor $14_2$ is not turned on. As a result, a high-level ($+V_{CC}$) signal is supplied to the base of transistor T5 and transistor T5 is rendered ON, supplying electric current to coils M1 and M2. For the input voltage level higher than the reference voltage level, on the other hand, comparator $14_1$ delivers a highlevel signal to transistor $14_2$ to cause the latter to be rendered conductive. As a result, a low-level signal is supplied to transistor T5, causing the latter to be rendered OFF and thus stopping the supply of electric current to coils M1 and M2.

Similarly, transistors T3 and T4 are connected to coils M3 and M4, respectively, and to current detection resistor R2, and a junction between transistors T3 and T4 is connected through current control circuit 17 to transistor T6. Input terminals 15 and 16 are connected to transistors T3 and T4, respectively.

Flywheel diodes HD1 and HD2, grounded at the negative side of a power supply, are connected one to common terminal 18 between coils M1 and M2 and one to common terminal 19 between coils M3 and M4. With transistors T5 and T6 OFF, current paths are established as HD1 →M1 →T1 →R1 →HD1, HD1 →M2 →T2 →R1 →HD1, HD2 →M3 →T3 →R2 →HD2, and HD2 →M4 →T4 →R2 →HD2.

Coils M1 through M4 are connected through zener diode ZD to flyback diodes BD1 through BD4 which are connected at the positive terminal of the power supply.

Diodes BD1 through BD4 form current paths due to the counter electromotive forces which are caused when transistors T1 through T4 change from their ON state to their OFF state. For coil M1, for example, the current path is formed as T5 →M1 →BD1 →ZD →T5, at which time zener diode ZD causes the disappearance of the current resulting from the aforementioned counter electromotive force.

The operation of the constant current chopper circuit of FIG. 1 will be explained below with reference to FIGS. 3A through 3E.

FIGS. 3A through 3D show input signals S1 through S4 supplied to the bases of transistors T1 through T4. FIG. 3E shows the waveform of current I1 through coil M1. When the signal S1 (FIG. 3A) becomes high, transistor T1 is turned ON, thus exciting coil M1 in four-phase stepping motor 11. At this time, the level of current I1 flowing through coil M1 gradually rises, as shown in FIG. 3E, and the level of voltage across detection resistor R1 is raised. The raised voltage is supplied to comparator $14_1$ in constant current control circuit 14 where it is compared with the reference voltage level. When the voltage level is lower than the reference voltage level, i.e., the level of the current through coil M1 is lower than the set level, comparator $14_1$ delivers a low-level output signal to the base of transistor $14_2$ and thus transistor $14_2$ is not turned ON. Accordingly, transistor T5 is turned ON, since a high-level signal is supplied to transistor T5.

When the level of current through coil M1 is higher than the reference level, comparator $14_1$ supplies a high-level signal to the base of transistor $14_2$ and hence transistor $14_2$ is rendered on. On the other hand, transistor T5 is turned OFF, since a low-level signal is supplied to transistor T5.

The aforementioned operation is repeated during the high-level periods of the signal, S1 so that the excitation current through coil M is maintained constant. With the signal S1 at a low level, transistor T1 is cut off, so that the level of current through coil M1 is gradually reduced to zero.

The same operation is performed for coils M2 through M4 and, in this way, coils M2 through M4 are sequentially excited, thus driving stepping motor 11.

According to the conventional stepping motor driving circuit as set out above, the closed-loop chopper driving circuit detects the level of current through the coil in the stepping motor and controls the current in the coil on the basis of the result of detection, whereby it is possible to maintain the excitation current in the coil at a constant level and thereby stabilizing the torque characteristic when the stepping motor is driven at fast speed.

In the closed-loop chopper driving circuit, however, the resistor of the current detection circuit increases as the size of the stepping motor driving circuit becomes greater, resulting in a greater error in the level of the resistor.

As shown in FIG. 2, a signal with a saw-tooth waveform is supplied to the input of comparator $14_1$. However, a noise problem arises due to an oscillation caused when the signal frequency exceeded a given level. Furthermore, the current control circuit becomes complex, requiring a greater number of components. As a result, such a circuit occupies a greater area while, at the same time, adding to the manufacturing costs.

SUMMARY OF THE INVENTION

It is accordingly the object of this invention to provide a stepping motor driving circuit which is simpler in its circuit arrangement, lower in cost, and never degrades the torque characteristic.

In order to achieve the aforementioned object, there is provided a stepping motor driving circuit for driving a stepping motor having a plurality of excitation coils, which comprises an excitation-switching timing signal generator for generating an excitation-switching timing signal for controlling the excitation switching of the plurality of excitation coils; an excitation coil selecting unit for seguentially selecting the switching of the plurality of excitation coils in synchronism with the excitation-switching timing signal; a power supply for providing an excitation power supply for the plurality of excitation coils to be excited; an excitation control switching unit, connected between the power supply and the plurality of excitation coils, for coupling the power supply to the excitation coil selected by the excitation coil selecting unit; a first pulse generator for generating, in synchronism with the excitation switching timing signal, a first pulse signal having a pulse width corresponding to a time period from the coupling of the power supply to the selected coil until the excitation current flowing through the excitation coil reaches a predetermined level; a second pulse generator for generating a train of second pulses of a high-frequency wave, having a smaller pulse width than that of the first pulse signal, during a time period in which the generation of the first pulse signal is stopped; and a control unit, connected to receive the first pulse signal and second pulse signal train, for selectively rendering the excitation control switching unit on and off in accordance with the received pulse signal.

BRIEF DESCRIPTION OF THE DRAWINGS

Other objects and features of this invention will be apparent from the following description taken in connection with the accompanying drawings in which:

FIG. 1 is a circuit arrangement showing a conventional motor driving circuit;

FIG. 2 is a circuit diagram showing a constant current control circuit of FIG. 1 in more detail;

FIGS. 3A through 3E show timing charts for explaining the operation of the stepping motor driving circuit of FIG. 1, FIGS. 3A through 3D showing excitation signals S1 through S4 supplied to transistors T1 through T4, respectively, and FIG. 3E showing a current Il flowing through coil M1;

FIG. 4 is a circuit arrangement showing a stepping motor driving according one embodiment of this invention;

FIGS. 5A through 5I show timing charts for explaining the operation of the stepping motor drive circuit of FIG. 4, FIG. 5A showing excitation switching signal CT in coils M1 through M4, FIG. 5B showing clock signal CK of a high-frequency wave supplied to input signal 22, FIG. 5C showing overdrive signal DS1 for coils M1 and M2 supplied to input terminal 23, FIG. 5D showing overdrive signal D2 for coils M3 and M4 supplied to input terminal 25, FIGS. 5E through 5H showing excitation signals S11, S12, S13 and S14 supplied to input terminals 12, 13, 15 and 16, respectively, and FIG. 5I showing a current I11 flowing through coil M1;

FIGS. 7A through 7C show timing charts for explaining the operation of programmable interval timer 37 of FIG. 6, FIGS. 7A and 7B showing clock signal CK0 and motor operation starting signal G0 which are supplied from a CPU to programmable interval timer 37, and FIG. 7C showing an output signal a from programmable interval timer 37;

FIGS. 8A through 8C are timing charts for explaining the operation of programmable interval timer 51 of FIG. 6, FIG. 8A showing clock signal CK0 supplied from the CPU to programmable interval timer 51 of FIG. 6, FIG. 8B showing gate input signals G1 and G2, and FIG. 8C showing output signals b and c of a programmable one-shot timer;

FIGS. 9A through 9I are timing charts for explaining the operation of programmable interval timers 37 and 51, FIG. 9A showing excitation switching timing signal CT in coils M1 through M4, FIGS. 9B through 9E showing excitation signals S11, S12, S13 and S14 to be supplied to input terminals 12 through 16, FIG. 9F showing pulse signal d formed from the rising edge of signal S11 or S12, FIG. 9G showing overdrive signal DS1 to be supplied to coils M1 and M2, FIG. 9H showing pulse signal e formed from the rising edge of signal S13 or S14, and FIG. 9I showing overdrive signal DS2 to be supplied to coils M3 and M4; and FIGS. 10A through 10D are timing charts for explaining the operation of the programmable timer of FIG. 6, FIG. 10A showing an excitation switching signal S11 (S13), FIG. 10B showing a pulse signal d delivered in accordance with a rise in the excitation switching signal S11 (S13), FIG. 10C showing excitation switching signal S12 (S14), and FIG. 10D showing pulse signal e which is output in accordance with a rise in the excitation switching signal S12 (S14).

DETAILED DESCRIPTION OF THE PREFERRED EMBODIMENT

Figure 6:
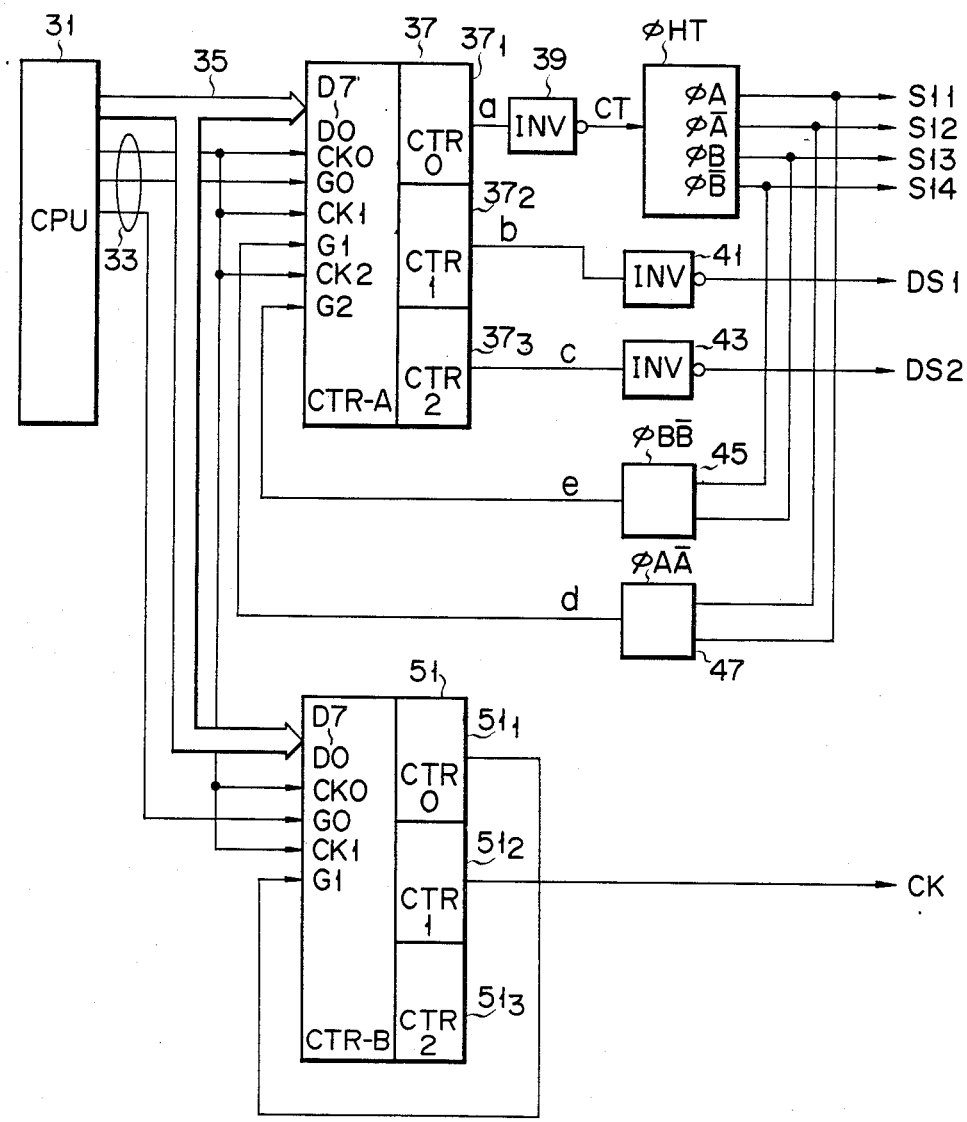
FIG. 6 is a circuit arrangement showing a programmable timer for generating excitation signals S11 through S14 supplied to transistors T1 through T4, overdrive signals DS1 and DS2 as well as clock signal CK supplied to NOR in the embodiment shown in FIG. 4.

The embodiment of this invention will be explained below in connection with a stepping motor driving circuit shown in FIG. 4. Four-phase stepping motor 11 includes four coils M1 through M4 of which the magnetic excitation of coils M1 and M2 are controlled by transistors T1 and T2. Transistors T1 and T2 are connected at their bases to input terminals 12 and 13 and their ON-OFF states are controlled by the levels of the signals which are supplied from input terminals 12 and 13. With transistors T1 and T2 in the ON state, coils M1 and M2 are magnetically excited and current is supplied to coils M1 and M2 from transistor T5. By means of NOR circuit 21, transistor T5 is controlled for conduction and cut off. When a high-level signal is input to either one of input terminals 22 and 23 of NOR circuit 21, transistor T5 is rendered conductive by NOR circuit 21. Due to the conduction of transistor T5, current flows through coils M1 and M2.

As in the case of coils M1 and M2, transistors T3 and T4 are similarly connected to coils M3 and M4 and turned ON when high level signals are supplied to input terminals 15 and 16. When this event occurs, current is passed through coils M3 and M4 so that magnetic excitation occurs. In this connection, it is to be noted that the current in coils M3 and M4 is controlled by transistor T6, which is in turn controlled by NOR circuit 24.

NOR circuit 24 has input terminal 25 and common input terminal 22 shared by NOR circuit 21, and renders transistor T6 conductive when a high-level signal is input to either one of input terminals 22 or 25. With transistor T6 ON, current flows through coils M3 and M4. Flyback diodes BD1 through BD4 are connected, like the arrangement of FIG. 1, to coils M1 through M4, respectively, and also commonly connected to zener diode ZD, with flywheel diodes HD1 and HD2 connected to a junction between coils M1 and M2 and a junction between coils M3 and M4, respectively. When transistors T5 and T6 change from the ON state to OFF state, current paths, including diode HD1 on one hand and diode HD2 on the other hand, are established as already set forth in connection with the circuit arrangement of FIG. 1, noting that current paths including diodes BD1 through BD4, respectively, are formed due to their counter electromotive forces caused when transistors T1 through T4 change from the ON state to the OFF state. The currents induced due to the aforementioned counter electromotive forces rapidly disappear due to the presence of zener diode ZD.

FIGS. 5A through 5I show timing charts for explaining the operation of the stepping motor driving circuit of FIG. 4, FIG. 5A showing excitation switching timing signals CT of coils M1 through M4, FIG. 5B showing clock signal CK of a high frequency wave supplied to input terminal 22, FIG. 5C showing overdrive signal DS1 for coils M1 and M2 supplied to input terminal 23, FIG. 5D showing overdrive signal DS2 for coils M3 and M4 supplied to input terminal 25, FIGS. 5E through 5H showing excitation signals S11, S12, S13 and S14, respectively, supplied to input terminals 11, 12, 13 and 14, and FIG. 5I showing current I11 flowing through coil M1. In this case, the overdrive signal is defined as a signal for maintaining transistor TR5 or TR6 conductive during the period of time necessary for the rated current to flow through the respective coils M1 through M4, noting that the pulse width of the overdrive signal is sought experimentally.

The clock signal CK, overdrive signals DS1 and DS2 and S11, S12, S13 and S14 are generated in a circuit shown in FIG. 6. In the arrangement of FIG. 6, CPU (central processing unit) 31 is comprised of a microprocessor, and is connected to first programmable interval timer (CTR-A) 37 and second programmable interval timer (CTR-B) 51 via data bus 35 and control lines 33. Programmable interval timers 37 and 51 may be configured with the use of, for example, Intel Corp. 8253 Programmable Interval Timers. CTR-A 37. comprises three timers CTR0 $37_1$, CTR1 $37_2$ and CTR2 $37_3$. Timer CTR0 $37_1$ is of such a type as to generate a repetition signal waveform, noting that a count value n is initially set to that timer. With a motor operation starting signal G0 (FIG. 7B) at a high level, timer CTR0 $37_1$ starts a counting operation and generates signal a, as shown in FIG. 7C, after an n number of counts have been made. Through inverter 39, signal a is supplied, as signal CT (see FIGS. 5A and 9A), to excitation switching signal generator $\phi$MT, which in turn generates excitation switching signals S11, S12, S13 and S14 for the stepping motor, as shown in FIGS. 5E through 5H and FIGS. 9B through 9E.

Timers CTR1 $37_2$ and CTR2 $37_3$ are of a programmable one-shot type, where a count value N is initially set from CPU 31. As shown in FIG. 8C, the output signals b and c of CTR1 $37_2$ and CTR2 $37_3$ become "L" level at a time of a count following the rising edge of gate input signal d (e) (see FIGS. 9F and 9H) and become "H" level after N number of counts have been made. The signals b and c are delivered respectively through inverters 41 and 43 to input terminals 23 and 25 of NOR gates 21 and 24 in the form of the overdrive signals DS1 and DS2.

CTR-B51 is also comprised of three timers CTR0 $51_1$, CTR1 $51_2$ and CTR2 $51_3$. CTR0 $51_1$ is of such a type as to generate a repetition wave signal and operates in the same fashion as CTR0 37, of CTR-A37. The pulse signal from CTR0 $51_1$ is defined as a pulse interval t4 of the clock signal CK, as shown in FIG. 5B. CTR1 $51_2$ is of a programmable one-shot type, and operates in the same fashion as CTR1 $37_2$ in CTR-A37. The pulse signal from CTR1 $37_2$ defines pulse width t3 of the signal CK, as shown in FIG. 5B.

Circuit $\phi$AA and $\phi$BB produce signals d and e on the basis of pulses which are prepared by the rising edges of signals S11 or S12 (S13 or S14), as seen from FIGS. 10A and 10C.

With signal S11 (FIG. 5E) at the high level, transistor T1 is turned ON, causing coil M1 to be magnetically excited. Similarly, when signals S12, S13 and S14 as shown in FIGS. 5F, 5G and 5H are at a high level, then coils M2, M3 and M4 are magnetically excited, respectively. The excitation states of coils M1 through M4 are sequentially switched with the use of signal CT, causing the rotation of four-phase stepping motor 11.

The signal DS1 becomes high level in synchronism with the switching of either one of signals S11 or S12 (see FIGS. 5E and 5F) from a low level to a high level. As a result, NOR circuit 21 supplies a low level signal to the base of transistor T5, causing transistor T5 to be rendered conductive. On the other hand, the signal DS2 becomes high level in synchronization with the switching of either one of the signals S13 or S14 from a low level to a high level, as seen from FIGS. 5D, 5G and 5H. Consequently, NOR circuit 24 supplies the low-level signal to the base of transistor T6 so that transistor T6 is turned ON. Here, the time intervals t1 and t2 of signals DS1 and DS2 are set by experimentally seeking a time required for the excitation current in coils M1 and M2 to reach a rated current level.

The signal CK is a clock signal (a high-frequency wave) of an adequately shorter time than a respective phase excitation time (the timing of signal CT) in the coil of four-phase stepping motor 11. The ON/OFF dutY ratio t3/t4 is set to be constant by experimentally seeking the rise and fall of the current in the coils of four-phase stepping motor 11. Since coils M3 and M4 have the same number of turns as coils M1 and M2, the time constants of the rise and fall of their excitation currents are equal. As a result, it is possible to set the times t1 and t2 equal to each other and thus to input the signal commonly to NOR circuits 21 and 24.

The operation of the stepping motor driving circuit will be explained below with reference to FIGS. 5A through 5I. Signals S11 through S14, as shown in FIGS. 5E through 5H, rise at the timing of signal CT. Stated in more detail, signals S11, S12, S13 and S14 rise at the timing of the first, second, third and fourth signals CT, respectively. High-level signal S11 is supplied to the base of transistor T1 so that it is turned ON. Similarly, high-level signal S12 is supplied to the base of transistor T2, causing transistor T2 to become conductive, at which time signals CK and DS1 are supplied to NOR circuit 21. Signal DS1 rises in synchronization with the rise of signals S11 or S12. Signal DS1 becomes high during the time period t1. As result, transistor T5 continues conduction during time period t1, while transistor T1 or T2 conducts, so that the current flowing through coil M1, for example, reaches a rated current level during time period t1 of signal DS1. After signal DS1 becomes a low level, transistor T5 is rendered on and off by high-frequency signal CK at an adequately high repetition rate, thus maintaining current I11 at a rated level. Similarly, coil M2 is excited, while maintaining a rated current level.

The same thing can also be true of coils M3 and M4 being conductive when signals S13 and S14 become high.

That is, since high-level signal S13 is supplied to base input terminal S13 of transistor T3, transistor T3 is turned ON, causing current to flow through coil M3 to allow coil M3 to be excited. Likewise, signal S14 of a high level is supplied to the base input terminal 14, resulting in the conduction of transistor T4 and consequent excitation. At this time, signal CK and signal DS2 are input to NOR circuit 24. Signal DS2 rises in synchronism with the rise of the signals S13 and S14, noting that it becomes a high level during time period t2. Consequently, transistor T6 conducts over the time period t2 when transistor T3 or T4 is in the ON state, so that current I13 through coil M3, for example, reaches a rated current level during time period t2 of signal DS2. After signal DS2 becomes a low level, transistor T6 is rendered on and off by high frequency signal CK at an adequately high repetition rate, maintaining current I13 at a rated level. Similarly, coil M4 is excited, while maintaining the rated current level.

In this way, coils M1 through M4 contained in four-phase stepping motor 11 are sequentially switched at the predetermined excitation timing and driven while maintaining the rated current level.

The aforementioned circuit obviates the need of constantly detecting the level of the currents in coils M1 through M4, assuring a simpler circuit arrangement as a whole. Furthermore, the currents flowing through coils M1 through M4 are controlled based on the predetermined signals so that it is possible to perform a stable excitation operation.

What is claimed is:

1. A stepping motor driving circuit for driving a stepping motor having a plurality excitation coils, comprising:
    excitation-switching timing signal generating means for generating an excitation-switching timing signal to control the excitation switching of the plurality of excitation coils;
    excitation-switching signal generatign means for generating a series of excitation-switching signals to switch the plurality of excitation coils, in synchronism with the excitation-switching timing signal generated from said excitation-switching timing signal generating means;
    excitation coil selecting means for sequentially selecting the switching of the plurality of excitation coils in synchronism with said excitation-switching signals;
    power supply means for providing excitation power to the plurality of exictation coils to be excited;
    excitation control switching means, connected between said power supply means and the plurality of excitation coils, for coupling said excitation power to one of said plurality of excitation coils selected by said excitation coil selecting means;
    first pulse-generating means for generating, in synchronism with said excitation switching signal, a series of first pulse signals having pulse widths corresponding to a time period from the coupling of said excitation power to said selected excitation coil until the excitation current flowing through the excitation coil reaches a predetermined level;
    second pulse-generating means for generating a second pulse signal train of a high-frequency wave, having a smaller pulse width than that of said series of first pulse signals, during a time period in which the generation of each of said series of first pulse signals is stopped; and
    control means, connected to receive said series of first pulse signals and said second pulse signal train, for selectively turning said excitation control switching means on and off in accordance with said series of first pulse signals and said second pulse signal train.

2. The stepping motor driving circuit according to claim 1, wherein said first pulse generating means is comprised of a first programmable timer for generating the said series of first pulse whose pulse signals width has an arbitrary value.

3. The stepping motor driving circuit according to claim 1, wherein said second pulse generating means is comprised of a second programmable timer for generating a clock signal, which is said second pulse signal train, at a proper duty ratio.

4. The stepping motor driving circuit according to claim 2, wherein said first programmable timer is connected to a central processing unit and generates said series of first pulse signals having a pulse width which is designated based on pulse width designation data supplied from said central processing unit.

5. The stepping motor driving circuit according to claim 3, wherein said second programmable timer is connected to said central processing unit and generates a second pulse signal train having a duty ratio which is designated based on duty ratio data supplied from said central processing unit.

6. A stepping motor driving circuit for driving a stepping motor having a plurality of excitation coils, comprising:
    excitation-switching timing signal generating means for generating an excitation-switching timing signal to control the excitation switching of the plurality of excitation coils;
    excitation-switching signal generating means for generating a series of excitation-switching signals to switch the plurality of excitation coils, in synchronism with the excitation-switching timing signal generated from said excitation-switching timing signal generating means;
    excitation coil selecting means for sequentially selecting the switching of the plurality of excitation coils in synchronism with said excitation-switching signals;
    power supply means for providing excitation power to the plurality of excitation coils to be excited;
    excitation control switching means, connected between said power supply means and the plurality of excitation coils, for coupling said excitation power to one of said plurality of excitation coils selected by said excitation coil selecting means;
    first pulse-generating means for generating, in synchronism with said excitation switching signal, a series of first pulse signals having pulse widths of a predetermined time duration;

second pulse-generating means for generating a second pulse signal train of a high-frequency wave, having a smaller pulse width than that of said series of first pulse signals, during a time period in which the generation of each of said series of first pulse signals is stopped; and control means, connected to receive said series of first pulse signals and said second pulse signal train, for selectively turning said excitation control switching means on and off in accordance with said series of first pulse signals and said second pulse signal train.

7. The stepping motor driving circuit of claim 6 wherein said second pulse generating means includes a second programmable timer for generating said second pulse signal at a first predetermined frequency.

8. The stepping motor driving circuit of claim 6 further comprising a central processing unit for supplying pulse width designation data to said first pulse generating means and pulse train duty ratio data to said second pulse generating means.

9. The stepping motor driving circuit of claim 6 wherein said first programmable timer includes means responsive to said pulse width designation data for generating said series of first pulse signals having a predetermined pulse width.

10. The stepping motor driving circuit of claim 7 wherein said second programmable timer includes means responsive to said duty ratio data for generating said second pulse signal train having a predetermined duty ratio.

* * * * *